United States Patent
Ding et al.

(10) Patent No.: US 11,048,253 B2
(45) Date of Patent: Jun. 29, 2021

(54) AGENT PRIORITIZATION FOR AUTONOMOUS VEHICLES

(71) Applicant: Waymo LLC, Mountain View, CA (US)

(72) Inventors: Kai Ding, Santa Clara, CA (US); Khaled Refaat, Mountain View, CA (US); Stephane Ross, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 106 days.

(21) Appl. No.: 16/198,130

(22) Filed: Nov. 21, 2018

(65) Prior Publication Data

US 2020/0159215 A1    May 21, 2020

(51) Int. Cl.
| | | |
|---|---|---|
| *G05D 1/00* | (2006.01) | |
| *G05D 1/02* | (2020.01) | |
| *G06N 5/02* | (2006.01) | |

(52) U.S. Cl.
CPC ......... *G05D 1/0088* (2013.01); *G05D 1/0214* (2013.01); *G05D 1/0221* (2013.01); *G06N 5/022* (2013.01); *G05D 2201/0213* (2013.01)

(58) Field of Classification Search
CPC .. G05D 1/0088; G05D 1/0214; G05D 1/0221; G06N 5/022; B60W 30/08; B60W 30/0956; B60K 2370/175; G06K 9/00805
See application file for complete search history.

(56) References Cited

U.S. PATENT DOCUMENTS

| | | | |
|---|---|---|---|
| 8,706,298 | B2 | 4/2014 | Goulding |
| 8,861,842 | B2 | 10/2014 | Jung et al. |
| 9,092,985 | B2 | 7/2015 | Richardson |
| 9,248,834 | B1 | 2/2016 | Ferguson et al. |
| 10,059,334 | B1 | 8/2018 | Zhu et al. |
| 2006/0165811 | A1 | 7/2006 | Black |
| 2008/0161986 | A1 | 7/2008 | Breed |

(Continued)

OTHER PUBLICATIONS

PCT International Search Report and Written Opinion in International Appln. No. PCT/US2019/060886, dated Mar. 13, 2020, 11 pages.

(Continued)

*Primary Examiner* — Anne Marie Antonucci
*Assistant Examiner* — Andrew J Cromer
(74) *Attorney, Agent, or Firm* — Fish & Richardson P.C.

(57) ABSTRACT

Methods, systems, and apparatus, including computer programs encoded on a computer storage medium, for identifying high-priority agents in the vicinity of a vehicle and, for only those agents which are high priority agents, generating data characterizing the agents using a first prediction model. In a first aspect, a system identifies multiple agents in an environment in a vicinity of a vehicle. The system generates a respective importance score for each of the agents by processing a feature representation of each agent using an importance scoring model. The importance score for an agent characterizes an estimated impact of the agent on planning decisions generated by a planning system of the vehicle which plans a future trajectory of the vehicle. The system identifies, as high-priority agents, a proper subset of the plurality of agents with the highest importance scores.

20 Claims, 4 Drawing Sheets

(56) References Cited

U.S. PATENT DOCUMENTS

| | | | | |
|---|---|---|---|---|
| 2010/0104199 | A1* | 4/2010 | Zhang | G08G 1/165 382/199 |
| 2012/0070034 | A1 | 3/2012 | Xiao et al. | |
| 2013/0054106 | A1* | 2/2013 | Schmudderich | G06K 9/6293 701/96 |
| 2014/0140353 | A1 | 5/2014 | Stahlin et al. | |
| 2014/0156806 | A1 | 6/2014 | Karpistsenko | |
| 2015/0286219 | A1 | 10/2015 | Reichel et al. | |
| 2016/0082953 | A1* | 3/2016 | Teller | B60W 30/00 701/23 |
| 2018/0046920 | A1 | 2/2018 | Yang | |
| 2018/0194349 | A1 | 7/2018 | McGill, Jr. | |
| 2018/0299275 | A1 | 10/2018 | Fong et al. | |
| 2020/0156632 | A1 | 5/2020 | Ding et al. | |

OTHER PUBLICATIONS

Girshick. "Fast R-CNN," arXiv 1504.08083v2, Sep. 27, 2015, 9 pages.

Leitner et al. "Learning Spatial Object Localization from Vision on a Humanoid Robot," International Journal of Advanced Robotic Systems, vol. 9, Dec. 2012, 10 pages.

Mehrasa et al. "Learning Person Trajectory Representations for Team Activity Analysis," arXiv 1706.00893v1, Jun. 3, 2017, 9 pages.

Zhao et al. "A novel three-dimensional object detection with the modified you only look once method," International Journal of Advanced Robotic Systems, Mar. 2018, 13 pages.

Nutzel, "AI-based movement planning for autonomous and teleoperated vehicles including the development of a simulation environment and an intelligent agent," retrieved from URL <https://mediatum.ub.tum.de/doc/1453739/file.pdf>, Jul. 2018, retrieved on Mar. 3, 2020, 120 pages.

PCT International Search Report and Written Opinion in International Appln. No. PCT/US2019/058836, dated Feb. 27, 2020, 12 pages.

Baumann et al., "Predicting Ego-Vehicle Paths from Environmental Observations with a Deep Neural Network," 2018 IEEE International Conference on Robotics and Automation (ICRA), May 2018, 4709-4716.

Deo et al., "Multi-Modal Trajectory Prediction of Surrounding Vehicles with Maneuver based LSTMs," https://arxiv.org/abs/1805.05499, May 2018, 6 pages.

Kim et al., "Probabilistic Vehicle Trajectory Prediction over Occupancy Grid Map via Recurrent Neural Network," https://arxiv.org/abs/1704.07049v1, Apr. 2017, 6 pages.

PCT International Search Report and Written Opinion in International Appln. No. PCT/US2019/060187, dated Mar. 19, 2020, 16 pages.

Refaat et al., "Agent Prioritization for Autonomous Navigation," https://arxiv.org/abs/1909.08792, Sep. 2019, 8 pages.

Schwarting et al., "Planning and Decision-Making for Autonomous Vehicles," Annual Review of Control, Robotics, and Autonomous Systems, Jan. 2018,1:187-210.

* cited by examiner

AGENT PRIORITIZATION FOR AUTONOMOUS VEHICLES

BACKGROUND

This specification relates to autonomous vehicles.

Autonomous vehicles include self-driving cars, boats, and aircraft. Autonomous vehicles use a variety of on-board sensors and computer systems to detect nearby objects and use such detections to make control and navigation decisions.

SUMMARY

This specification describes a system implemented as computer programs on-board a vehicle that generates prediction data for agents in a vicinity of the vehicle based on the estimated impacts of the agents on planning decisions generated by a planning system of the vehicle.

According to a first aspect there is provided a method performed by one or more data processing apparatus. The method includes identifying multiple agents in an environment in a vicinity of a vehicle. A respective importance score is generated for each of the agents, including, for each agent: processing a feature representation of the agent using an importance scoring model to generate an importance score for the agent, wherein the importance score for the agent characterizes an estimated impact of the agent on planning decisions generated by a planning system of the vehicle which plans a future trajectory of the vehicle; identifying, as high-priority agents, a proper subset of the plurality of agents with the highest importance scores; for only those agents of the plurality of agents that are identified as high-priority agents, generating data characterizing the agents using a first prediction model; and providing the data characterizing the high-priority agents generated using the first prediction model to the planning system of the vehicle to generate the planning decisions which plan the future trajectory of the vehicle.

In some implementations, identifying multiple agents in an environment in a vicinity of a vehicle includes identifying the agents in the environment in the vicinity of the vehicle using sensor data captured by one or more sensors of the vehicle.

In some implementations, the method further includes generating a respective feature representation of each of the plurality of agents using sensor data captured by one or more sensors of the vehicle, where the feature representation of an agent includes one or more of: a velocity of the agent, an acceleration of the agent, a type of the agent, a distance from the agent to the vehicle, and data indicating whether a predicted trajectory of the agent will overlap a trajectory of the vehicle.

In some implementations, identifying, as high-priority agents, a proper subset of the plurality of agents with the highest importance scores includes identifying, as high-priority agents, a predetermined number of the plurality of agents with the highest importance scores.

In some implementations, identifying, as high-priority agents, a proper subset of the plurality of agents with the highest importance scores includes identifying, as high-priority agents, each agent of the plurality of agents with an importance score that satisfies a predetermined threshold.

In some implementations, the method includes: for one or more of the agents that are not identified as high-priority agents, generating data characterizing the one or more agents using a second prediction model, where the first prediction model has a first number of model parameters, the second prediction model has a second number of model parameters, and the first number of model parameters is greater than the second number of model parameters; and providing the data characterizing the one or more agents generated using the second prediction model to the planning system in addition to the data characterizing the high priority agents generated using the first prediction model.

In some implementations, the first prediction model and the second prediction model are implemented as respective neural network systems.

In some implementations, for only those agents that are identified as high-priority agents, generating data characterizing the agents using a first prediction model includes: for only those agents that are identified as high-priority agents, generating data characterizing predicted future behavior of the agents using a first behavior prediction model; and providing the data characterizing the high-priority agents generated using the first prediction model to the planning system of the vehicle to generate the planning decisions which plan the future trajectory of the vehicle includes: providing the data characterizing the predicted future behavior of the high-priority agents generated using the first behavior prediction model to the planning system of the vehicle to generate the planning decisions which plan the future trajectory of the vehicle.

In some implementations, generating data characterizing the predicted future behavior of an agent includes generating, for each of multiple spatial locations in the environment, a respective probability that the agent will occupy the spatial location at a specified time point after a current time point.

In some implementations, the method includes providing the planning decisions which plan the future trajectory of the vehicle to a control system of the vehicle for use in controlling operation of the vehicle.

In some implementations, each operation of the method is performed on-board the vehicle.

According to a second aspect, there is provided a method, performed by one or more data processing apparatus, for training an importance scoring model, where the importance scoring model is configured to process a feature representation of an agent in a vicinity of a vehicle to generate an importance score for the agent, where the importance score for the agent characterizes an impact of the agent on planning decisions generated by a planning system of the vehicle which plans a future trajectory of the vehicle, the method including: generating multiple training examples, where each given training example includes: (i) respective feature representations of multiple given agents in a given vicinity of a given vehicle at a given time point, and (ii) data defining a given ranking of the given agents in the given vicinity of the given vehicle in order of their impact on given planning decisions generated by a given planning system which plans a future trajectory of the given vehicle, where generating a particular training example includes: for each of multiple particular agents in a particular vicinity of a particular vehicle at a particular time point, generating respective data characterizing a predicted future behavior of the particular agent using a behavior prediction neural network; providing, for each of the particular agents in the particular vicinity of the particular vehicle at the particular time point, the respective data characterizing the predicted future behavior of the particular agent to a particular planning system; receiving, from the particular planning system, particular planning decisions which plan a future trajectory of the particular vehicle; and determining, based on the particular planning decisions, a particular ranking of the particular agents in the particular vicinity of the particular vehicle at the particular time point in order of their impact on the particular planning decisions; and training the importance scoring model based on the training examples, including, for each given training example: training the importance scoring model to generate respective importance scores for the given agents characterized by the given training example that conform to the given ranking specified by the given training example.

In some implementations, generating training examples includes generating the training examples based on real or simulated driving data logs.

In some implementations, training the importance scoring model to generate respective importance scores for the given agents characterized by the given training example that conform to the given ranking specified by the given training example includes: processing a first feature representation of a first agent characterized by the given training example to generate a first importance score; processing a second feature representation of a second agent characterized by the given training example to generate a second importance score; determining a loss based on whether the first importance score and the second importance score conform to the given ranking specified by the given training example; and updating current parameter values of the importance scoring model based on the loss.

In some implementations, each of the particular planning decisions which plan the future trajectory of the particular vehicle include: (i) an action to be performed by the particular vehicle, and (ii) a particular agent in the particular vicinity of the particular vehicle which prompts the particular planning system to generate the particular planning decision.

In some implementations, determining, based on the particular planning decisions, a particular ranking of the particular agents in the particular vicinity of the particular vehicle at the particular time point in order of their impact on the particular planning decisions includes: determining a respective planning score for each particular agent based on any actions which the particular agent prompts the particular planning system to generate; and determining the particular ranking of the particular agents based on the respective planning scores of the particular agents.

In some implementations, each training example comprises respective feature representations of every agent in the vicinity of the vehicle that is detected by an object detection system of the vehicle.

In some implementations, the given ranking of the given agents defines: (i) a partition of the given agents into a plurality of groups, wherein each group comprises one or more given agents, and (ii) for each pair of groups comprising a first group and a second group, whether the given agents in the first group have a greater impact on the given planning decisions than the given agents in the second group.

According to a third aspect, there are provided one or more non-transitory computer storage media storing instructions that when executed by one or more computers cause the one or more computers to perform operations including the operations of the previously described method.

According to a fourth aspect, there is provided a system, including a data processing apparatus; and a memory in data communication with the data processing apparatus and storing instructions that cause the data processing apparatus to perform operations including the operations of the previously described method.

Particular embodiments of the subject matter described in this specification can be implemented so as to realize one or more of the following advantages.

In order for a planning system of a vehicle to generate planning decisions which cause the vehicle to travel along a safe and comfortable trajectory, the planning system must be provided with timely and accurate prediction data (e.g., behavior prediction data) for the agents in the vicinity of the vehicle. However, generating prediction data for an agent in the vicinity of the vehicle may require substantial computational resources (e.g., memory, computing power, or both). In certain situations, a large number of other agents in the environment may be in the vicinity of the vehicle (e.g., when the vehicle is traveling along a busy highway). In these situations, the limited computational resources available on-board the vehicle may be insufficient to generate timely prediction data for all the agents in the vicinity of the vehicle.

The on-board system described in this specification can concentrate the limited computational resources available on-board the vehicle (e.g., memory, computing power, or both) on generating precise prediction data for only those agents which are likely to have the biggest impact on the planning decisions generated by the planning system. In this manner, the on-board system described in this specification can generate timely prediction data which enables the planning system to generate planning decisions that cause the vehicle to travel along a safe and comfortable trajectory despite the limited computational resources available on-board the vehicle.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how an on-board system of a vehicle can generate prediction data (e.g., behavior prediction data) for agents in the vicinity of the vehicle. The agents in the vicinity of the vehicle may be, for example, pedestrians, bicyclists, or other vehicles. To generate the prediction data, the on-board system determines a respective importance score for each agent in the vicinity of the vehicle. The importance score for an agent characterizes an estimated impact of the agent on planning decisions generated by a planning system of the vehicle which plan the future trajectory of the vehicle. The on-board system identifies which of the agents in the vicinity of the vehicle are "high-priority" agents based on the importance scores, and generates precise prediction data for these high-priority agents using a prediction model. For the remaining agents in the vicinity of the vehicle which are not high-priority agents, the on-board system can use less computationally-intensive (but potentially less precise) prediction models to generate prediction data. Alternatively, the on-board system may refrain from generating prediction data for some or all of the agents that are not determined to be high-priority agents. These features and other features are described in more detail below.

Figure 1:
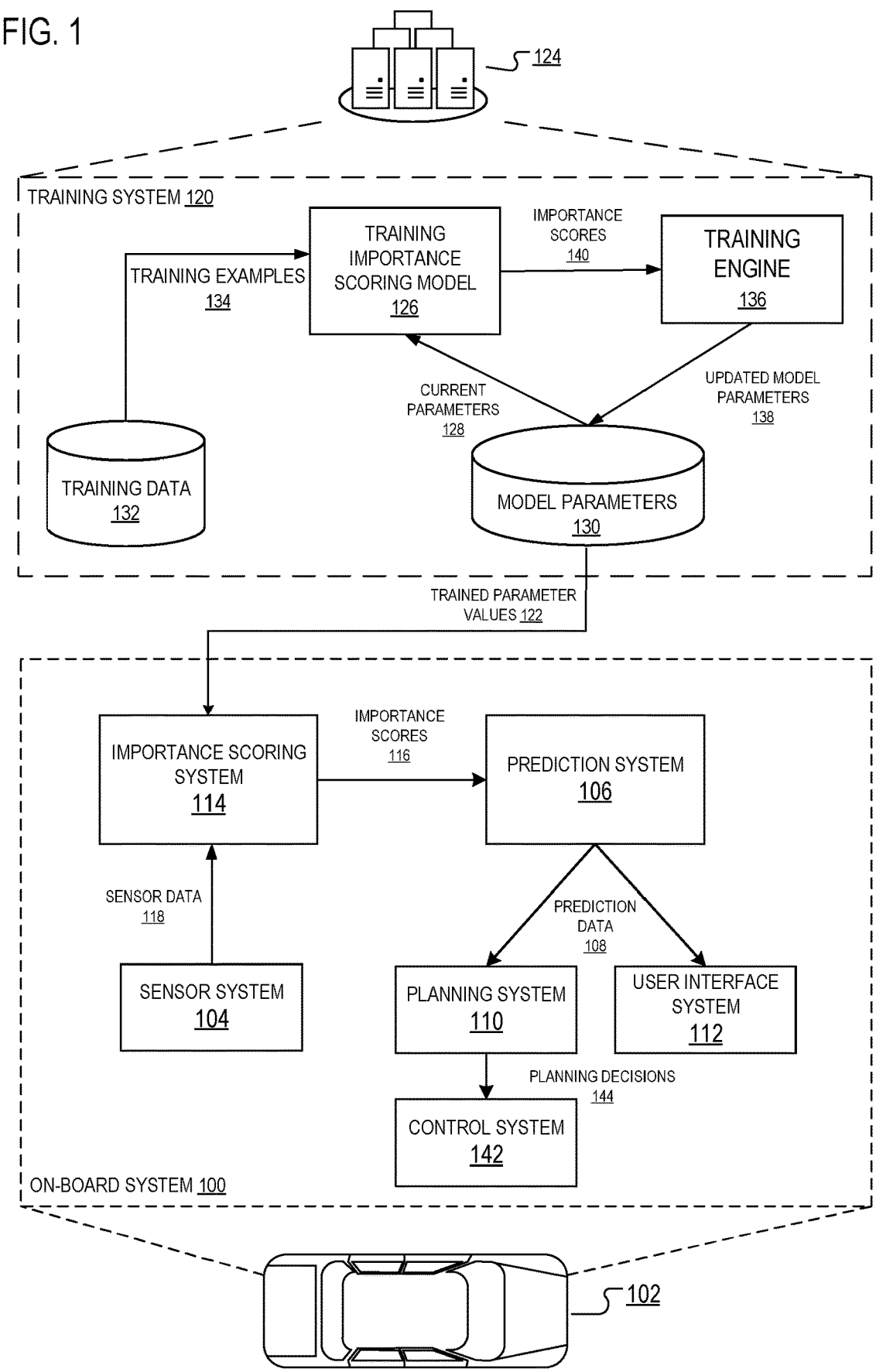
FIG. 1 is a block diagram of an example on-board system.

FIG. 1 is a block diagram of an example on-board system 100. The on-board system 100 is composed of hardware and software components, some or all of which are physically located on-board a vehicle 102. In some cases, the on-board system 100 can generate planning decisions which plan the future trajectory of the vehicle 102, present information to the driver of the vehicle 102 to assist the driver in operating the vehicle safely, or both. For example, in response to determining that the trajectory of another vehicle is likely to cross the trajectory of the vehicle 102, the on-board system 100 may generate planning decisions which adjust the future trajectory of the vehicle 102 to avoid a collision (e.g., by braking). As another example, in response to determining that the trajectory of another vehicle is likely to cross the trajectory of the vehicle 102, the on-board system 100 may present an alert message which prompts the driver of the vehicle 102 to adjust the trajectory of the vehicle 102 to avoid a collision.

Although the vehicle 102 in FIG. 1 is depicted as an automobile, and the examples in this specification are described with reference to automobiles, in general the vehicle 102 can be any kind of vehicle. For example, besides an automobile, the vehicle 102 can be a watercraft or an aircraft. Moreover, the on-board system 100 can include components additional to those depicted in FIG. 1 (e.g., a collision detection system or a navigation system).

The on-board system 100 includes a sensor system 104 which enables the on-board system 100 to "see" the environment in the vicinity of the vehicle 102. More specifically, the sensor system 104 includes one or more sensors, some of which are configured to receive reflections of electromagnetic radiation from the environment in the vicinity of the vehicle 102. For example, the sensor system 104 can include one or more laser sensors (e.g., LIDAR laser sensors) that are configured to detect reflections of laser light. As another example, the sensor system 104 can include one or more radar sensors that are configured to detect reflections of radio waves. As another example, the sensor system 104 can include one or more camera sensors that are configured to detect reflections of visible light.

The sensor system 104 continually (i.e., at each of multiple time points) captures raw sensor data which can indicate the directions, intensities, and distances travelled by reflected radiation. For example, a sensor in the sensor system 104 can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in angle, azimuth, or both. Sweeping in azimuth, for example, can allow a sensor to detect multiple objects along the same line of sight.

At any given time point, one or more agents in the environment may be in the vicinity of the vehicle 102. The agents in the vicinity of the vehicle 102 may be, for example, pedestrians, bicyclists, or other vehicles. The on-board system 100 uses a prediction system 106 to continually (i.e., at each of multiple time points) generate prediction data 108 which characterizes some or all of the agents in the vicinity of the vehicle 102. For example, for each of multiple agents in the vicinity of the vehicle 102, the prediction data 108 may be behavior prediction data which defines respective probabilities that the agent makes each of a predetermined number of possible driving decisions (e.g., yielding, changing lanes, passing, braking, or accelerating). As another example, for each of the multiple agents in the vicinity of the vehicle 102, the prediction data 108 may be classification prediction data which defines respective probabilities that the agent is each of a predetermined number of possible agent types (e.g., animal, pedestrian, bicyclist, car, or truck).

The on-board system 100 can provide the prediction data 108 generated by the prediction system 106 to a planning system 110, a user interface system 112, or both.

When the planning system 110 receives the prediction data 108, the planning system 110 can use the prediction data 108 to generate planning decisions 144 which plan the future trajectory of the vehicle 102. The planning decisions 144 generated by the planning system 110 can include, for example: yielding (e.g., to pedestrians), stopping (e.g., at a "Stop" sign), passing other vehicles, adjusting vehicle lane position to accommodate a bicyclist, slowing down in a school or construction zone, merging (e.g., onto a highway), and parking. In a particular example, the on-board system 100 may provide the planning system 110 with behavior prediction data indicating that the future trajectory of another vehicle is likely to cross the future trajectory of the vehicle 102, potentially resulting in a collision. In this example, the planning system 110 can generate a planning decision 144 to apply the brakes of the vehicle 102 to avoid a collision.

The planning decisions 144 generated by the planning system 110 can be provided to a control system 142 of the vehicle 102. The control system 142 of the vehicle can control some or all of the operations of the vehicle by implementing the planning decisions 144 generated by the planning system. For example, in response to receiving a planning decision 144 to apply the brakes of the vehicle, the control system 142 of the vehicle 102 may transmit an electronic signal to a braking control unit of the vehicle. In response to receiving the electronic signal, the braking control unit can mechanically apply the brakes of the vehicle.

When the user interface system 112 receives the prediction data 108, the user interface system 112 can use the prediction data 108 to present information to the driver of the vehicle 102 to assist the driver in operating the vehicle 102 safely. The user interface system 112 can present information to the driver of the vehicle 102 by any appropriate means, for example, by an audio message transmitted through a speaker system of the vehicle 102 or by alerts displayed on a visual display system in the vehicle (e.g., an LCD display on the dashboard of the vehicle 102). In a particular example, the on-board system 100 may provide the user interface system 112 with prediction data 108 indicating that the future trajectory of another vehicle is likely to cross the future trajectory of the vehicle 102, potentially resulting in a collision. In this example, the user interface system 112 can present an alert message to the driver of the vehicle 102 with instructions to adjust the trajectory of the vehicle 102 to avoid a collision.

In order for the planning system 110 to generate planning decisions which cause the vehicle 102 to travel along a safe and comfortable trajectory, the on-board system 100 must provide the planning system 110 with timely and accurate prediction data 108. However, the prediction system 106 may require substantial computational resources (e.g., memory, computing power, or both) to generate prediction data 108 for an agent in the vicinity of the vehicle. In certain situations, a large number of other agents in the environment may be in the vicinity of the vehicle 102 (e.g., when the vehicle 102 is traveling along a busy highway). In these situations, the limited computational resources available on-board the vehicle 102 may be insufficient for the prediction system 106 to generate timely prediction data 108 for all the agents in the vicinity of the vehicle 102.

To enable the prediction system 106 to generate timely prediction data 108, the on-board system 100 can identify one or more of the agents in the vicinity of the vehicle 102 as "high-priority" agents. In some cases, the on-board system 100 identifies only a fraction of the agents in the vicinity of the vehicle 102 as high-priority agents. The prediction system 106 is then configured to generate precise prediction data 108 for the high-priority agents using a prediction model (e.g., a prediction neural network). The prediction system 106 can generate prediction data 108 for any remaining agents which are not identified as high-priority agents, and which will be referred to in this specification as "low-priority" agents, using less computationally intensive (but potentially less precise) behavior prediction models. Alternatively, the on-board system 100 may refrain from generating any prediction data 108 for some or all of the low-priority agents. In this specification, a "prediction model" should be understood as implementing a prediction algorithm.

The on-board system 100 determines which of the agents in the vicinity of the vehicle 102 to designate as high-priority agents using an importance scoring system 114. The importance scoring system 114 is configured to generate a respective importance score 116 for each agent in the vicinity of the vehicle 102 using an importance scoring model. The importance scoring model can be implemented, for example, as a neural network model, a random forest model, a support vector machine (SVM) model, or as any other type of trainable machine learning model.

More specifically, the importance scoring model is configured to process respective feature representations of the agents in the vicinity of the vehicle in accordance with trained parameter values of the importance scoring model to generate the importance scores 116 for the agents in the vicinity of the vehicle. As will be described in more detail below with reference to FIG. 2, the importance scoring system 114 determines the respective feature representation characterizing each agent in the vicinity of the vehicle 102 based at least in part on the sensor data 118 generated by the sensor system 104. The importance score 116 for an agent characterizes an estimated impact of the agent on the planning decisions generated by the planning system 110 which plan the future trajectory of the vehicle 102. After generating the importance scores 116, the on-board system 100 can determine one or more of the agents in the vicinity of the vehicle with the highest importance scores to be high-priority agents.

In a particular example, at a particular intersection there may be: (i) an oncoming vehicle which may turn into the path of the vehicle 102, and (ii) a bicyclist which is far behind the vehicle 102 and unlikely to affect the planning decisions of the planning system 110. In this example, the importance scoring system 114 may generate a higher importance score for the oncoming vehicle than for the bicyclist, potentially causing the oncoming vehicle to be designated a high-priority agent and the bicyclist a low-priority agent.

By generating prediction data 108 based on the importance scores 116, the on-board system 100 can concentrate its limited computational resources on generating precise prediction data 108 for only those agents which are likely to have the biggest impact on the planning decisions generated by the planning system 110. In this manner, the on-board system 100 can generate timely prediction data 108 which enables the planning system 110 to generate planning decisions that cause the vehicle to travel along a safe and comfortable trajectory despite the limited computational resources available on-board the vehicle 102.

In some cases, the on-board system 100 can provide the importance scores 116 directly to the planning system 110. The planning system 110 can use the importance scores 116 by, for example, allocating a greater amount of computational resources to processing data characterizing the high-priority agents than the low-priority agents in generating the planning decisions 144. More generally, any processing module of the on-board system (including but not limited to the prediction system 106 and the planning system 110) can use the importance scores 116 to allocate a greater amount of computational resources to processing data characterizing the high-priority agents than the low-priority agents.

To allow the importance scoring system 114 to accurately prioritize agents, a training system 120 can determine trained parameter values 122 of the importance scoring model included in the importance scoring system 114. The training system 120 is typically hosted within a data center 124, which can be a distributed computing system having hundreds or thousands of computers in one or more locations.

The training system 120 includes a training importance scoring model 126 that is configured to process agent feature representations to generate corresponding importance scores 140 for the agents. The training system 120 includes multiple computing devices having software or hardware modules that implement the operations of the training importance scoring model 126. For example, if the training importance scoring model 126 is an importance scoring neural network, then the training system 120 includes multiple computing devices having software or hardware modules that implement the respective operations of each layer of the training importance scoring neural network according to an architecture of the training importance scoring neural network. The training importance scoring model 126 is generally the same model (or almost the same model) as the on-board importance scoring model. For example, if the training importance scoring model is a neural network, then it generally has (at least partially) the same architecture as the on-board importance scoring neural network included in the importance scoring system 114.

The training importance scoring model 126 can compute the operations of the training importance scoring model 126 using current values of parameters 128 stored in a collection of model parameters 130. Although illustrated as being logically separated, the model parameters 130 and the software or hardware modules performing the operations may actually be located on the same computing device or on the same memory device.

The training system 120 trains the training importance scoring model 126 using a training data set 132 which includes multiple training examples 134. The training examples 134 may be obtained from real or simulated driving logs. Each of the training examples 134 includes respective feature representations of each agent in a vicinity of a vehicle at a respective time point as well as a label defining a ranking of the agents in order of their impact on planning decisions generated by a planning system of the vehicle. An example process for generating training examples 134 is described with reference to FIG. 4.

The training importance scoring model 126 can process the respective agent feature representations from the training examples 134 to generate, for each training example 134, respective importance scores 140. A training engine 136 analyzes the importance scores 140 and compares the ranking of the agents defined by the importance scores 140 to the ranking of the agents defined by the labels in the training examples 134. For example, when the training importance scoring model 126 is a neural network, the training engine 136 can compute gradients of a loss function that characterizes the difference between the ranking of the agents defined by the generated importance scores 140 and the ranking of the agents defined by the labels in the training examples 134. In a particular example, the loss function may be a binary (e.g., cross-entropy) loss function which characterizes whether the ranking of two of the agents defined by the generated importance scores 140 is the same as the ranking of the two agents defined by the labels in the training examples 134.

The training engine 136 then generates updated model parameter values 138 by using an appropriate machine learning training technique (e.g., stochastic gradient descent). The training engine 136 can then update the collection of model parameters 130 using the updated model parameter values 138.

After training is complete, the training system 120 can provide a set of trained parameter values 122 to the on-board system 100 for use in generating importance scores that enable the generation of timely and accurate behavior prediction data 108. The training system 120 can provide the set of trained parameter values 122 by a wired or wireless connection to the on-board system 100.

Figure 2:
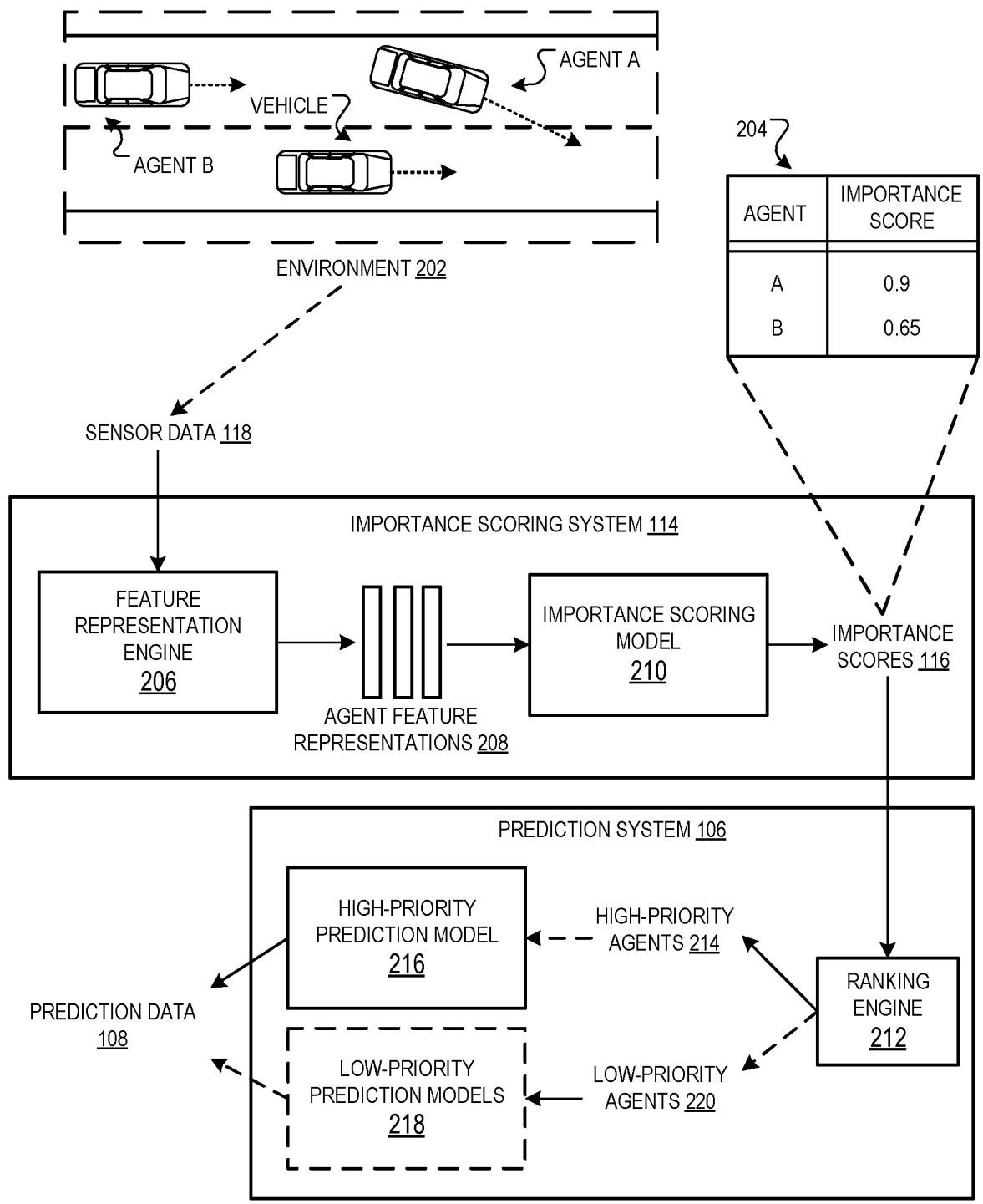
FIG. 2 is a block diagram of an example importance scoring system and an example prediction system.

FIG. 2 is a block diagram of an example importance scoring system 114 and an example prediction system 106. The importance scoring system 114 and the prediction system 106 are examples of systems implemented as computer programs on one or more computers in one or more locations in which the systems, components, and techniques described below are implemented.

The importance scoring system 114 is configured to process sensor data 118 (generated by the sensor system 104 of the vehicle 102) which characterizes the environment 202 in the vicinity of the vehicle 102 to generate a respective importance score 116 for each agent in the vicinity of the vehicle 102. The importance score 116 for an agent characterizes an estimated impact of the agent on planning decisions generated by the planning system of the vehicle 102 which plan the future trajectory of the vehicle 102.

In a particular example depicted in FIG. 2, the environment 202 is a roadway and two vehicles, denoted Agent A and Agent B, are in the vicinity of the vehicle 102. Agent A is maneuvering to cut in front of the vehicle 102, while Agent B is travelling parallel to the vehicle 102. In this example, the importance scoring system 114 may assign a higher importance score to Agent A than to Agent B, specifically, because Agent A is likely to have a greater impact on the planning decisions generated by the planning system 110 of the vehicle 102. For example, the planning system 110 of the vehicle 102 may generate planning decisions which cause the vehicle 102 to brake to avoid a collision with Agent A. As depicted by 204, the importance scoring system 114 may generate an importance score of 0.9 for Agent A, and an importance score of 0.65 for Agent B.

To generate the importance scores 116, the importance scoring system 114 processes the sensor data 118 using a feature representation engine 206 which is configured to identify each of the agents in the vicinity of the vehicle 102 and generate a respective feature representation 208 of each of the agents.

The feature representation engine 206 can identify the agents in the vicinity of the vehicle 102 in any appropriate manner. For example, the feature representation engine 206 may process the sensor data 118 using an object detection neural network to generate data defining the predicted positions and types (e.g., vehicle, pedestrian, bicyclist, and the like) of multiple objects in the vicinity of the vehicle 102. The feature representation engine 206 can subsequently identify the agents in the vicinity of the vehicle as those objects that have been identified as being, for example, a vehicle, a person, or a bicyclist.

After identifying the agents in the vicinity of the vehicle 102, the feature representation engine 206 can generate a respective feature representation 208 of each of the agents. A feature representation 208 of an agent refers to numerical data represented in any appropriate numerical format (e.g., as a vector or a matrix) which characterizes the agent. The feature representation of an agent can include one or more of: a velocity of the agent (e.g., measured in miles per hour—mph), an acceleration of the agent (e.g., measured in feet per second squared), a type of the agent (e.g., pedestrian, vehicle, bicyclist, and the like), a distance from the agent to the vehicle 102 (e.g. measured in feet), data indicating whether (and when) a predicted future trajectory of the agent will overlap with a future trajectory of the vehicle 102, a position of the agent relative to the vehicle 102, and data characterizing the velocity, acceleration, and heading of the agent over a previous window of time (e.g., 5 seconds).

The importance scoring system 114 processes each of the agent feature representations 208 using an importance scoring model 210 to generate a respective importance score 116 for each of the agents in the vicinity of the vehicle 102. Each of the importance scores 116 is represented as a respective numerical value. The importance scoring model can be implemented as any appropriate model, for example, as a neural network (with any appropriate architecture), a random forest, or a support vector machine. A few example importance scoring models are described with reference to FIG. 3.

The importance scores 116 generated by the importance scoring system 114 are used by the prediction system 106 to generate prediction data 108 which characterizes one or more agents in the vicinity of the vehicle. For example, the prediction data 108 may be behavior prediction data which characterizes the predicted future behavior of one or more of the agents in the vicinity of the vehicle 102. In this example, for one or more of the agents in the vicinity of the vehicle 102, the prediction data 108 may define respective probabilities that the agent makes each of a predetermined number of possible driving decisions (e.g., yielding, changing lanes, passing, braking, or accelerating). As another example, the prediction data 108 may be classification prediction data which defines respective probabilities that the agent is each of a predetermined number of possible agent types (e.g., animal, pedestrian, bicyclist, car, or truck). Further examples of prediction data are described with reference to FIG. 3.

The prediction system 106 processes the importance scores 116 using a ranking engine 212 to identify which (if any) of the agents in the vicinity of the vehicle 102 are high-priority agents. For example, the ranking engine 212 may identify each agent with an importance score that satisfies a predetermined threshold as a high-priority agent. In a particular example, the ranking engine may identify each agent with an importance score that exceeds the predetermined threshold of 0.8 as a high-priority agent. As another example, the ranking engine 212 may identify a predetermined number of the agents with the highest importance scores as high-priority agents. In a particular example, the ranking engine 212 may identify the three agents with the highest importance scores as high priority agents. As another example, the ranking engine may identify a dynamically determined number of agents with the highest importance scores as high-priority agents based on the computational resources currently available on-board the vehicle for behavior prediction.

After identifying the high-priority agents 214, the prediction system 106 uses a high-priority prediction model 216 to generate respective prediction data 108 for each of the high-priority agents 214. The high-priority prediction model 216 may generate prediction data 108 for an agent by, for example, processing a representation of the trajectory of the agent up to the current time point using a prediction neural network.

The prediction system 106 can use low-priority prediction models 218 to generate respective prediction data 108 for each of the remainder of the agents which the ranking engine 212 does not identify as high-priority agents 214 (i.e., the low-priority agents 220). In some cases, the prediction system 106 processes each of the low-priority agents 220 with the same low-priority prediction model. In some cases, the prediction system 106 includes multiple low-priority prediction models with different numbers of model parameters, and processes low-priority agents that have higher importance scores with low-priority behavior prediction models with more model parameters. Generally, the high-priority prediction model 216 has a greater number of model parameters than the low-priority prediction model 218, and can therefore generate more precise prediction data 108 than the low-priority prediction model 218. However, the low-priority prediction model 218 may consume fewer computational resources (e.g., memory, computing power, or both) than the high-priority prediction model 216. In a particular example, the high-priority prediction model 216 may be implemented as a deep neural network with thousands of model parameters, while the low-priority prediction model 218 may be implemented as a linear model with tens or hundreds of model parameters.

In some cases, the prediction system 106 may refrain from generating prediction data 108 for some or all of the low-priority agents 220. For example, the prediction system 106 may postpone generating behavior prediction data for the low-priority agents 220 until a later time point when more computational resources are available. In these examples, the prediction system 106 may require that prediction data be generated for each of the agents in the vicinity of the vehicle (regardless of their priority) with at least a minimum frequency (e.g., once per second).

The prediction data 108 generated for the high-priority agents 214 by the high-priority prediction model 216, and any prediction data 108 generated for the low-priority agents by the low-priority prediction model 218, is provided to the planning system 110 for use in generating planning decisions.

Figure 3:
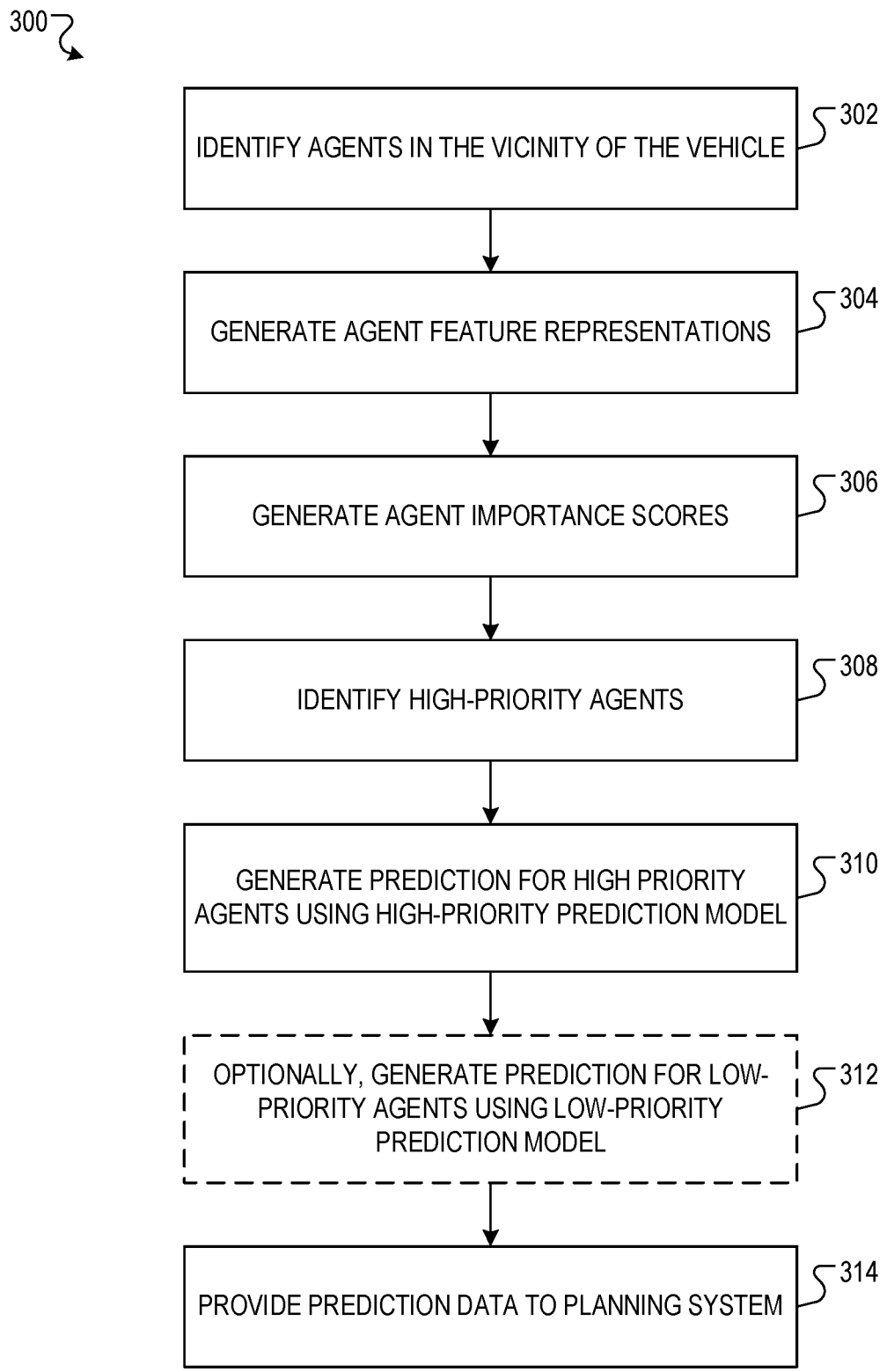
FIG. 3 is a flow diagram of an example process for generating prediction data to be provided to a planning system.

FIG. 3 is a flow diagram of an example process 300 for generating prediction data to be provided to a planning system. For convenience, the process 300 will be described as being performed by a system of one or more computers located in one or more locations. For example, an on-board system, e.g., the on-board system 100 of FIG. 1, appropriately programmed in accordance with this specification, can perform the process 300.

The system identifies the agents in the vicinity of the vehicle (302). For example, the system may process sensor data generated by a sensor system of the vehicle using an object detection neural network to generate data defining the predicted positions and types (e.g., vehicle, pedestrian, bicyclist, and the like) of multiple objects in the vicinity of the vehicle. The system can subsequently identify the agents in the vicinity of the vehicle as those objects that have been identified as being, for example, a vehicle, a person, or a bicyclist. In certain situations, the system may not identify any agents in the vicinity of the vehicle, for example, if the vehicle is travelling on an otherwise empty roadway. In these situations, the system may not generate any prediction data at the time point. The description of the process 300 which follows assumes that the system identifies one or more agents in the vicinity of the vehicle.

The system generates a respective feature representation of each of the agents in the vicinity of the vehicle (304). The feature representation of an agent can include one or more of: a velocity of the agent (e.g., measured in miles per hour—mph), an acceleration of the agent (e.g., measured in feet per second squared), a type of the agent (e.g., pedestrian, vehicle, bicyclist, and the like), a distance from the agent to the vehicle (e.g. measured in feet), and data indicating whether a predicted future trajectory of the agent will overlap with a future trajectory of the vehicle.

The system can generate the feature representation of an agent from: portions of the sensor data characterizing the agent, behavior prediction data previously generated by the system for the agent (e.g., at a previous time point), or from any other source of information. For example, the system may determine the velocity and acceleration of the agent from the sensor data generated by laser and radar sensors of the vehicle. The system may determine the type of the agent from the output of an object detection neural network which is configured to process the sensor data (as described with reference to step 302). The system may determine whether a predicted future trajectory of the agent will overlap with the future trajectory of the vehicle based on behavior prediction data previously generated by the system (e.g., at a previous time point) which predicts the future trajectory of the agent.

The system generates a respective importance score for each agent in the vicinity of the vehicle by processing the agent feature representations using an importance scoring model (306). The importance scoring model can be implemented as any appropriate prediction model, for example, as a neural network, a random forest, or support vector machine. When the importance scoring model is implemented as a neural network, the importance scoring neural network can have any appropriate neural network architecture. For example, the importance scoring neural network may be configured to separately process each of the agent feature representations to generate respective importance scores for each of the agents. In this example, the architecture of the importance scoring neural network may be defined by a sequence of fully-connected layers followed by an output layer consisting of a single neuron. The importance score output of the importance scoring neural network may be defined as the activation of this neuron.

The system identifies the high-priority agents in the vicinity of the vehicle based on the importance scores (308).

For example, the system may identify each agent with an importance score that satisfies a predetermined threshold as a high-priority agent. As another example, the system may identify a predetermined number of the agents with the highest importance scores as high-priority agents. In certain situations, the system may identify none or all of the agents in the vicinity of the vehicle as high-priority agents.

The system generates prediction data for the high-priority agents using a prediction model (310). In some implementations, the prediction model may generate classification prediction data which predicts the type of an agent (e.g., animal, pedestrian pushing cart, pedestrian directing traffic, pedestrian riding scooter, car, truck, and the like). In some implementations, the behavior prediction model may generate behavior prediction data which characterizes a predicted future behavior of an agent (e.g., braking, accelerating, changing lanes, and the like). In these implementations, the behavior prediction model may generate behavior prediction data for an agent by, for example, processing a representation of the trajectory of the agent up to the current time point using a behavior prediction neural network. A few examples follow.

In some implementations, the behavior prediction data for an agent defines, for each of multiple spatial locations in the environment, a respective probability that the agent will occupy the spatial location at a specified time point after the current time point. In these implementations, the output layer of the behavior prediction neural network may be a sigmoid layer with a respective neuron corresponding to each of the spatial locations in the environment. The probability that the agent will occupy a particular spatial location at the specified time point after the current time point may be defined as the activation of the neuron in the sigmoid output layer that corresponds to the particular spatial location.

In some implementations, the behavior prediction data for an agent defines a probability that a candidate future trajectory of the agent is the actual future trajectory of the agent. In these implementations, the output layer of the behavior prediction neural network may include a single neuron, where the activation of the neuron is defined as the output of an activation function with an output range of [0, 1] (e.g., a sigmoid activation function). The probability that the candidate future trajectory of the agent is the actual future trajectory of the agent may be defined as the activation of the single neuron in the output layer.

In some implementations, the behavior prediction data for an agent defines a respective probability that the agent will make each of a predetermined number of possible driving decisions. For example, the possible driving decisions may include one or more of: yielding, changing lanes, passing, braking, and accelerating. In these implementations, the output layer of the behavior prediction neural network may be a sigmoid layer with a respective neuron corresponding to each of the possible driving decisions. The probability that the agent will make a particular driving decision after the current time point may be defined as the activation of the neuron in the sigmoid output layer that corresponds to the particular driving decision.

Optionally, the system generates prediction data for any low-priority agents (i.e., agents that are not designated as high-priority agents) using one or more prediction models which are less computationally intensive than the prediction model used to generate the prediction data for the high-priority agents (312). For example, the prediction model(s) used to generate prediction data for the low-priority agents may have fewer model parameters than the prediction model used to generate prediction data for the high-priority agents. In a particular example, the prediction models may be neural networks, and the neural network(s) used for the low-priority agents may have fewer neural network weights than the neural network(s) used for the high-priority agents. In some cases, the system may determine not to generate any prediction data for some or all of the low-priority agents (e.g., if their respective importance scores do not satisfy a predetermined threshold).

The system provides the generated prediction data (for the high-priority agents, and optionally, for any low-priority agents) to the planning system of the vehicle (314). The planning system uses the prediction data to generate planning decisions which plan the future trajectory of the vehicle.

Figure 4:
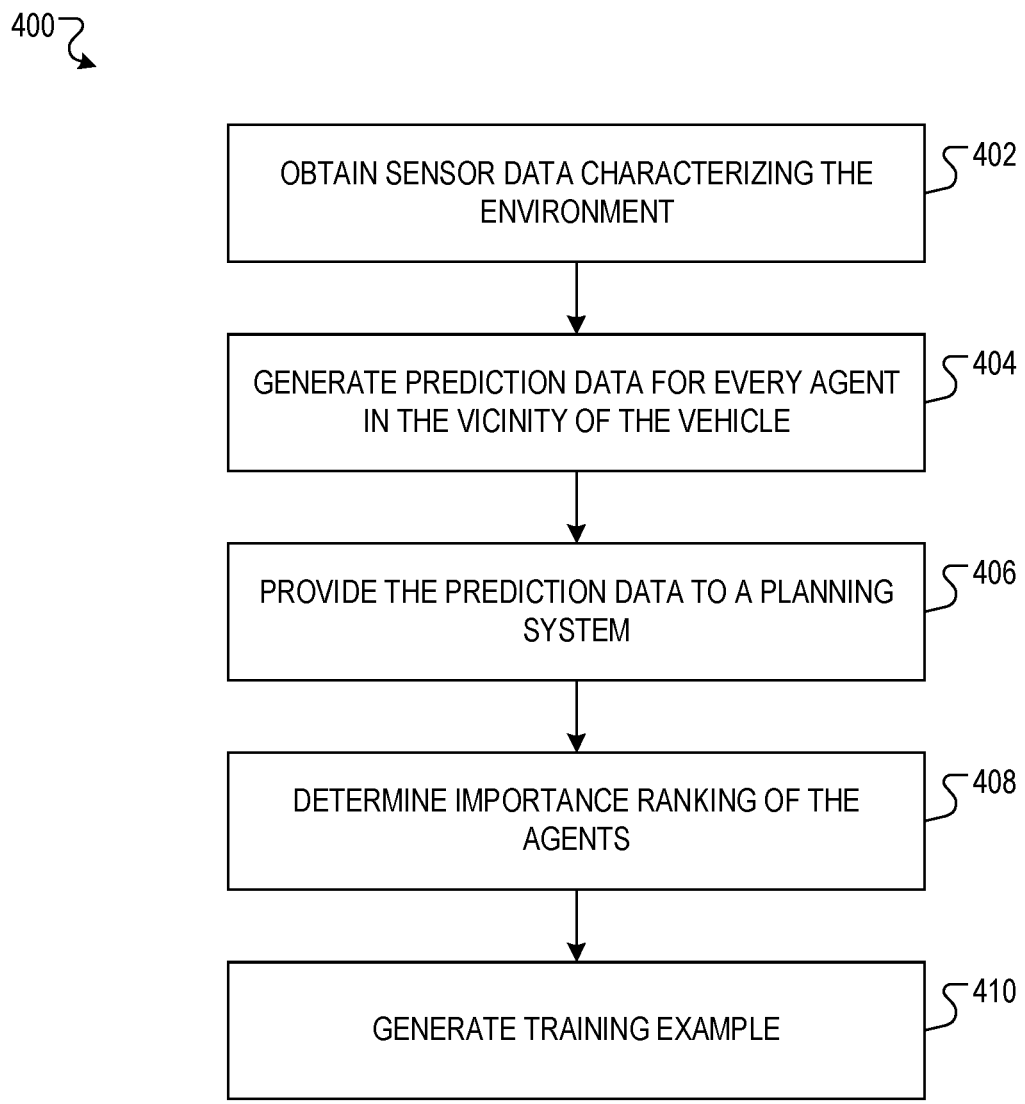
FIG. 4 is a flow diagram of an example process for generating a training example which can be used to train an importance scoring model.

FIG. 4 is a flow diagram of an example process 400 for generating a training example which can be used to train an importance scoring model. For convenience, the process 400 will be described as being performed by a system of one or more computers located in one or more locations. For example, a training system, e.g., the training system 120 of FIG. 1, appropriately programmed in accordance with this specification, can perform the process 400.

The system obtains sensor data characterizing the environment in a vicinity of a vehicle at a given time point (402). The system may obtain the sensor data from a sensor data log which is stored in a physical data storage device or a logical data storage area. The sensor data may be real sensor data characterizing a real-world environment in the vicinity of a vehicle, or simulated sensor data characterizing a simulated environment in the vicinity of a simulated vehicle. As described with reference to FIG. 1, the sensor data may be generated by one or more sensors of the vehicle, including one or more of: laser sensors, radar sensors, and camera sensors.

The system generates respective prediction data for the agents in the vicinity of the vehicle (404). For example, the system may generate respective prediction data for every agent in the vicinity of the vehicle which is identified by an object detection system of the vehicle. The behavior prediction data generated by the system for each agent characterizes the predicted future behavior of the agent. For example, for each of the agents in the vicinity of the vehicle, the behavior prediction data may define respective probabilities that the agent makes each of a predetermined number of possible driving decisions (e.g., yielding, changing lanes, passing, braking, or accelerating). To generate the behavior prediction data for an agent, the system may process a representation of the trajectory of the agent up to the given time point using a behavior prediction model (e.g., a behavior prediction neural network as described with reference to FIG. 3).

The system provides the behavior prediction data to a planning system which is configured to process the behavior prediction data to generate planning decisions which plan a future trajectory for the vehicle (406). The planning decisions generated by the planning system can, for example, include: yielding (e.g., to other vehicles), stopping (e.g., at a Stop sign), passing other vehicles, adjusting vehicle lane position to accommodate a bicyclist, slowing down in a school or construction zone, merging (e.g., onto a highway), and parking.

The system processes the planning decisions generated by the planning system to determine a ranking of the agents in the vicinity of the vehicle at the given time point in order of their impact on the planning decisions (408). The system may determine the ranking of the agents based on how much the behavior of each agent prompts the planning system to generate planning decisions which would change the future trajectory of the vehicle. For example, the system may determine a score for each agent based on how much each agent prompts the planning system to generate planning decisions which would change the future trajectory of the vehicle, and then determine the ranking of the agents using the scores. In a particular example, the system may determine a score of 12 for Agent A, a score of 0 for Agent B, and a score of 4.5 for Agent C, in which case the system may determine the ranking of the agents as: [A,C,B].

For example, each of the planning decisions may define: (i) an action to be performed by the vehicle (e.g., accelerating, decelerating, stopping, or swerving), and (ii) an agent in the vicinity of the vehicle which prompts the planning system to generate the planning decision (if applicable). In this example, the system may generate a score of 0 for agents which do not prompt the planning system to generate any planning decisions. For an agent which does prompt the planning system to generate a planning decision, the system may determine the score for the agent as a predetermined function of the action specified by the planning decision. For example, if the planning decision specifies the action of braking at 10 feet per second squared, the system may determine the score for the agent to be 10. If a single agent prompts the planning system to generate multiple planning decisions (e.g., braking and swerving), the system can determine the score for the agent as a sum (or other combination) of the respective scores generated for each of the multiple planning decisions.

The ranking of the agents can be broadly understood to be any data which defines that certain agents in the vicinity of the vehicle have a greater impact on the planning decisions than certain other agents in the vicinity of the vehicle. For example, the ranking of the agents may define an explicit ordering of the agents from highest-rank to lowest-ranked, where each agent is assigned a distinct rank. As another example, the ranking of the agents may define a partition of the agents into multiple groups, where each group includes one or more agents. For each pair of groups including a first group and a second group, the ranking may define whether the agents in the first group have a greater impact on the planning decisions than the agents in the second group. The agents within a given group may be understood to have an equivalent impact on the planning decisions.

The system generates a training example which includes: (i) respective feature representations of every agent in the vicinity of the vehicle, and (ii) label data defining the ranking of the agents in the vicinity of the vehicle (410). As described with reference to FIG. 2 and FIG. 3, the system can generate the feature representation of an agent from portions of the sensor data characterizing the agent, from behavior prediction data generated for the agent by a behavior prediction system at previous time points, or from any other source of information.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus, the method comprising:

identifying a plurality of agents currently located at respective locations in an environment in a vicinity of a vehicle;
generating a respective importance score for each of the plurality of agents, comprising, for each agent:
  processing a feature representation of the agent using an importance scoring model to generate an importance score for the agent,
  wherein the importance score for the agent characterizes an estimated impact of the agent on planning decisions generated by a planning system of the vehicle which plans a future trajectory of the vehicle;
selecting, for one or more of the agents, a respective prediction model for use in generating data characterizing the agent based on the importance score for the agent, comprising:
  identifying, as high-priority agents, a proper subset of the plurality of agents with the highest importance scores; and
  selecting, for only those agents of the plurality of agents that are identified as high-priority agents, a first prediction model for use in generating data characterizing the agent; and
generating, for each of the high-priority agents, data characterizing the agent using the first prediction model selected for the agent; and
providing the data characterizing the high-priority agents generated using the first prediction model to the planning system of the vehicle to generate the planning decisions which plan the future trajectory of the vehicle.

2. The method of claim 1, wherein identifying a plurality of agents currently located at respective locations in an environment in a vicinity of a vehicle comprises:
  identifying the plurality of agents in the environment in the vicinity of the vehicle using sensor data captured by one or more sensors of the vehicle.

3. The method of claim 1, further comprising generating a respective feature representation of each of the plurality of agents using sensor data captured by one or more sensors of the vehicle, wherein the feature representation of an agent comprises one or more of: a velocity of the agent, an acceleration of the agent, a type of the agent, a distance from the agent to the vehicle, and data indicating whether a predicted trajectory of the agent will overlap a trajectory of the vehicle.

4. The method of claim 1, wherein identifying, as high-priority agents, a proper subset of the plurality of agents with the highest importance scores comprises:
  identifying, as high-priority agents, a predetermined number of the plurality of agents with the highest importance scores; or
  identifying, as high-priority agents, each agent of the plurality of agents with an importance score that satisfies a predetermined threshold.

5. The method of claim 1, further comprising:
  providing the planning decisions which plan the future trajectory of the vehicle to a control system of the vehicle for use in controlling operation of the vehicle.

6. The method of claim 1, wherein each operation of the method is performed on-board the vehicle.

7. The method of claim 1, wherein selecting, for one or more of the agents, a respective prediction model for use in generating data characterizing the agent based on the importance score for the agent further comprises:
  identifying, as low-priority agents, one or more of the agents that are not identified as high-priority agents; and
  selecting, for each agent identified as a low-priority agent, a second prediction model for use in generating data characterizing the agent, wherein the second prediction model is different than the first prediction model;
wherein the method further comprises:
  generating, for each of the low-priority agents, data characterizing the agent using the second prediction model;
  providing, to the planning system of the vehicle, the data characterizing the low-priority agents generated using the second prediction model in addition to the data characterizing the high-priority agents generated using the first prediction model.

8. The method of claim 7, wherein the first prediction model has a first number of model parameters, the second prediction model has a second number of model parameters, and the second number of model parameters is less than the first number of model parameters.

9. The method of claim 7, wherein the first prediction model and the second prediction model are implemented as respective neural network systems.

10. The method of claim 1, wherein the first prediction model is a first behavior prediction model; and
wherein generating, for each of the high-priority agents, data characterizing the agent using the first prediction model selected for the agent comprises:
  generating, for each of the high-priority agents, data characterizing predicted future behavior of the agent using the first behavior prediction model.

11. The method of claim 10, wherein generating data characterizing the predicted future behavior of the agent comprises generating, for each of multiple spatial locations in the environment, a respective probability that the agent will occupy the spatial location at a specified time point after a current time point.

12. A system, comprising:
  a data processing apparatus;
  a memory in data communication with the data processing apparatus and storing instructions that cause the data processing apparatus to perform operations comprising:
    identifying a plurality of agents currently located at respective locations in an environment in a vicinity of a vehicle;
    generating a respective importance score for each of the plurality of agents, comprising, for each agent:
      processing a feature representation of the agent using an importance scoring model to generate an importance score for the agent,
      wherein the importance score for the agent characterizes an estimated impact of the agent on planning decisions generated by a planning system of the vehicle which plans a future trajectory of the vehicle;
    selecting, for one or more of the agents, a respective prediction model for use in generating data characterizing the agent based on the importance score for the agent, comprising:
      identifying, as high-priority agents, a proper subset of the plurality of agents with the highest importance scores; and
      selecting, for only those agents of the plurality of agents that are identified as high-priority agents, a first prediction model for use in generating data characterizing the agent; and generating, for each of the high-priority agents, data characterizing the agent using the first prediction model selected for the agent; and providing the data characterizing the high-priority agents generated using the first prediction model to the planning system of the vehicle to generate the planning decisions which plan the future trajectory of the vehicle.

13. The system of claim 12, wherein identifying a plurality of agents currently located at respective locations in an environment in a vicinity of a vehicle comprises:

identifying the plurality of agents in the environment in the vicinity of the vehicle using sensor data captured by one or more sensors of the vehicle.

14. The system of claim 12, wherein the operations further comprise generating a respective feature representation of each of the plurality of agents using sensor data captured by one or more sensors of the vehicle, wherein the feature representation of an agent comprises one or more of: a velocity of the agent, an acceleration of the agent, a type of the agent, a distance from the agent to the vehicle, and data indicating whether a predicted trajectory of the agent will overlap a trajectory of the vehicle.

15. The system of claim 12, wherein identifying, as high-priority agents, a proper subset of the plurality of agents with the highest importance scores comprises:

identifying, as high-priority agents, a predetermined number of the plurality of agents with the highest importance scores; or identifying, as high-priority agents, each agent of the plurality of agents with an importance score that satisfies a predetermined threshold.

16. One or more non-transitory computer storage media storing instructions that when executed by one or more computers cause the one or more computers to perform operations comprising:

identifying a plurality of agents currently located at respective locations in an environment in a vicinity of a vehicle;

generating a respective importance score for each of the plurality of agents, comprising, for each agent:

processing a feature representation of the agent using an importance scoring model to generate an importance score for the agent, wherein the importance score for the agent characterizes an estimated impact of the agent on planning decisions generated by a planning system of the vehicle which plans a future trajectory of the vehicle;

selecting, for one or more of the agents, a respective prediction model for use in generating data characterizing the agent based on the importance score for the agent, comprising:

identifying, as high-priority agents, a proper subset of the plurality of agents with the highest importance scores; and selecting, for only those agents of the plurality of agents that are identified as high-priority agents, a first prediction model for use in generating data characterizing the agent; and generating, for each of the high-priority agents, data characterizing the agent using the first prediction model selected for the agent; and providing the data characterizing the high-priority agents generated using the first prediction model to the planning system of the vehicle to generate the planning decisions which plan the future trajectory of the vehicle.

17. The one or more non-transitory computer storage media of claim 16, wherein identifying a plurality of agents currently located at respective locations in an environment in a vicinity of a vehicle comprises:

identifying the plurality of agents in the environment in the vicinity of the vehicle using sensor data captured by one or more sensors of the vehicle.

18. The one or more non-transitory computer storage media of claim 16, wherein the operations further comprise generating a respective feature representation of each of the plurality of agents using sensor data captured by one or more sensors of the vehicle, wherein the feature representation of an agent comprises one or more of: a velocity of the agent, an acceleration of the agent, a type of the agent, a distance from the agent to the vehicle, and data indicating whether a predicted trajectory of the agent will overlap a trajectory of the vehicle.

19. The one or more non-transitory computer storage media of claim 16, wherein identifying, as high-priority agents, a proper subset of the plurality of agents with the highest importance scores comprises:

identifying, as high-priority agents, a predetermined number of the plurality of agents with the highest importance scores.

20. The one or more non-transitory computer storage media of claim 16, wherein identifying, as high-priority agents, a proper subset of the plurality of agents with the highest importance scores comprises:

identifying, as high-priority agents, each agent of the plurality of agents with an importance score that satisfies a predetermined threshold.

* * * * *